(12) United States Patent
Iorfida et al.

(10) Patent No.: US 7,453,441 B1
(45) Date of Patent: Nov. 18, 2008

(54) METHOD AND SYSTEM FOR INTELLIGENT KEYBOARD ILLUMINATION

(75) Inventors: Dario Iorfida, Fiumicino (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,253

(22) Filed: Mar. 31, 2008

(51) Int. Cl.
*G09G 5/00* (2006.01)
*B41J 29/00* (2006.01)
*H03K 17/94* (2006.01)

(52) U.S. Cl. .................. 345/170; 345/168; 341/22; 400/711; 200/310

(58) Field of Classification Search .......... 345/168–172
See application file for complete search history.

(56) References Cited

U.S. PATENT DOCUMENTS

| | | | |
|---|---|---|---|
| 5,736,976 A * | 4/1998 | Cheung | 345/168 |
| 5,852,414 A * | 12/1998 | Yu et al. | 341/22 |
| 5,963,671 A * | 10/1999 | Comerford et al. | 382/230 |
| 6,621,424 B1 * | 9/2003 | Brand | 341/22 |
| 6,646,572 B1 * | 11/2003 | Brand | 341/22 |
| 7,283,066 B2 | 10/2007 | Shipman | |
| 2005/0073446 A1 | 4/2005 | Lazaridis et al. | |
| 2005/0231933 A1 | 10/2005 | Chuang | |
| 2005/0250547 A1 * | 11/2005 | Salman et al. | 455/566 |
| 2006/0011461 A1 | 1/2006 | Chan et al. | |
| 2006/0022951 A1 | 2/2006 | Hull | |
| 2006/0158353 A1 * | 7/2006 | Tseng | 341/22 |
| 2006/0283698 A1 | 12/2006 | Huang et al. | |
| 2007/0046641 A1 * | 3/2007 | Lim | 345/173 |
| 2007/0132735 A1 | 6/2007 | Gil-Gomez | |

OTHER PUBLICATIONS

Fox, Scanned optical keyboard, IBM Technical Disclosure Bulletin, Feb. 1978, vol. 20, no.

* cited by examiner

*Primary Examiner*—Duc Q Dinh
(74) *Attorney, Agent, or Firm*—Carpenter & Assoc.; Robert K. Carpenter

(57) ABSTRACT

A method of illuminating a computer keyboard, including: providing a keyboard with individually illuminatable keys; probabilistically determining the most likely key(s) that would be pressed next; illuminating the key(s) that are determined to be most likely pressed next while leaving keys probabilistically least likely to be pressed next unilluminated, an electronic dictionary is utilized to determine keys likely needed and the dictionary suggests keys based on running applications such that, if a calculator is running, numeric keys are illuminated and if a word processor is running, alphabet and related keys are illuminated; updating the electronic dictionary to include new words; disabling selective illumination when filling identification and password fields; providing disabling and enabling options; after time when none of the suggested keys have been pressed, automatically illuminating all keys; after additional time when none of all illuminated keys have been pressed, unilluminating all of the keys.

1 Claim, 1 Drawing Sheet

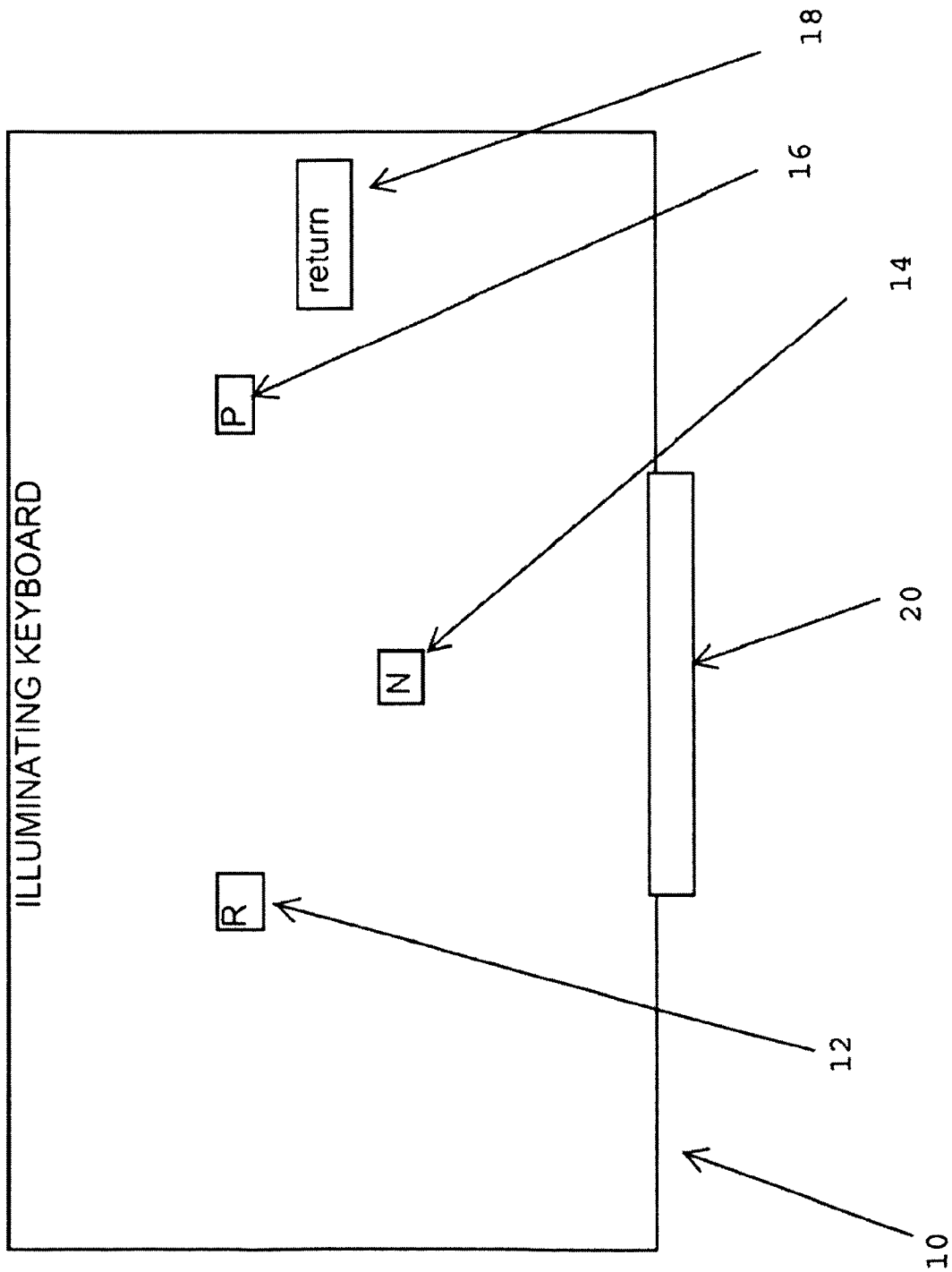

METHOD AND SYSTEM FOR INTELLIGENT KEYBOARD ILLUMINATION

CROSS-REFERENCE TO RELATED APPLICATIONS (Not Applicable)

STATEMENT REGARDING FEDERALLY SPONSORED RESEARCH OR DEVELOPMENT (Not Applicable)

THE NAMES OF THE PARTY TO A JOINT RESEARCH AGREEMENT (Not Applicable)

INCORPORATION-BY-REFERENCE OF MATERIAL SUBMITTED ON A COMPACT DISC (Not Applicable)

BACKGROUND OF THE INVENTION (1) Field of the Invention

This disclosure is directed to a method and system for intelligent computer keyboard illumination.

(2) Description of Related Art Including Information Submitted under 37 CFR 1.97 and 1.98

Illuminated keyboards are known. For example, Gil-Gomez (U.S. Published Patent Application No. 20070132735) discloses selectively illuminated keyboard systems and methods.

BRIEF SUMMARY OF THE INVENTION

This disclosure is directed to a method of illuminating a computer keyboard, including: providing a computer keyboard that has keys that are each individually illuminatable; after a key on the computer keyboard has been pressed, probabilistically determining the most likely key or keys that would be pressed next; illuminating the key or keys that are determined to be probabilistically most likely pressed next while leaving the keys probabilistically least likely to be pressed next unilluminated, wherein an electronic dictionary is utilized to determine the most likely keys to be needed and wherein the electronic dictionary presents suggested keys based on a specific application that is running on a computer such that, if a calculator application is running, numeric keys will be illuminated and if a word processor application is running the most likely alphabet keys, along with enter and space bar, will be illuminated; continuously updating the electronic dictionary to include new words typed on the keyboard; automatically disabling the selective illumination when user identification and password fields are being filled; providing a user with the option of enabling or disabling the selective illumination of keyboard keys; after a configured timeframe when none of the suggested keys have been pressed, automatically illuminating all of the keys; after an additional configured timeframe where none of the illuminated keys have been pressed, automatically unilluminating all of the keys.

Other exemplary embodiments and advantages of this disclosure can be ascertained by reviewing the present disclosure and the accompanying drawings.

BRIEF DESCRIPTION OF THE SEVERAL VIEWS OF THE DRAWING(S)

This disclosure is further described in the detailed description that follows, with reference to the drawings, in which the FIGURE illustrates a representation of a selectively illuminated computer keyboard.

DETAILED DESCRIPTION OF THE INVENTION

Exemplary embodiments of this disclosure are described herein by way of example.

In particular, this disclosure is directed to a computer keyboard such as keyboard 10 in the FIGURE, having selectively illuminated keys (the "R" key 12, the "W" key 14, and the "P" key 16, along with the return key 18 and the space bar key 20 are shown illuminated in the FIGURE) and related methods and systems utilizing the keyboard. Users can utilize notebook or laptop computers and other electronic medium in a large variety of places where often illumination may not be suitable enough for the users to clearly identify keys on electronic keyboards.

A solution can be based on the continuous illumination of the keys similar to the way commercial mobile telephones are illuminated. Another solution is to provide a small light such as those utilized on the top of laptop screens.

However, a disadvantage of such solutions is the fact that the illumination itself is power consuming so that the use of the light can have a large impact on battery consumption and, therefore, a large impact on the capability of the user using the device for a long period of time without a power connection.

Moreover, some individuals that use keyboards may not be accomplished in typing on the keyboard, and they may search often for the next character to type. A method, apparatus, and system that can help them reduce the time in writing a document can be very beneficial.

At least one aspect of this disclosure is directed to a method, apparatus, and system to address the above-discussed issues by the utilization of an intelligent system for keyboard illumination.

The method, apparatus, and system take advantage of the fact that a user generally does not need the entire set of keys, such that the system can save power simply lighting the keys that are going to be probabilistically utilized.

Thus, with this method, apparatus, and system, the keys that are most likely to be utilized are illuminated rather than illumination of the entire keyboard.

In order to forecast the next keys the user needs, the method, apparatus, and system utilize a dictionary to determine the most likely keys to be needed and provide the illumination of the keys that are suggested by the dictionary. For example, logic can be utilized that is the same as or similar to the logic utilized by a T9 dictionary based system.

Moreover the dictionary can be:

continuously updated by any new used words typed on the keyboard;

based on the specific application that is running on the system (for example Microsoft Word or the Calculator); and/or disabled in case of user/password fields filling (e.g., unlocking the system).

The specific power profile of the user can be configured so that the user can enable or disable the profile based on their preferences.

Additionally, the system can be configured to recognize that, after a configured timeframe during which none of the suggested keys have been pressed, the system can automatically highlight all of the keys and/or after a new configured timeframe, hide (not illuminate) all of the keys (for example the user may be thinking or performing another operation and not typing for an extended period of time) in a screensaver-like mode. Additionally, in at least some embodiments, the keys can all be hidden (not illuminated) if the screensaver starts or if the user locks the system.

With at least some embodiments, the above techniques can be utilized to help a user practice typing to become more accomplished at typing.

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

The invention claimed is:

1. A method of illuminating a computer keyboard, comprising:

providing a computer keyboard that has keys that are each individually illuminatable;

after a key on the computer keyboard has been pressed, probabilistically determining the most likely key or keys that would be pressed next;

illuminating the key or keys that are determined to be probabilistically most likely pressed next while leaving the keys probabilistically least likely to be pressed next unilluminated, wherein an electronic dictionary is utilized to determine, for selective illumination of keyboard keys, the most likely keys to be needed and wherein the electronic dictionary presents suggested keys based on a specific application that is running on a computer such that, if a calculator application is running, numeric keys will be illuminated and if a word processor application is running the most likely alphabet keys, along with enter and space bar, will be illuminated;

continuously updating the electronic dictionary to include new words typed on the keyboard;

automatically disabling the selective illumination of keyboard keys when user identification and password fields are being filled;

providing a user with the option of enabling or disabling the selective illumination of keyboard keys;

after a configured timeframe when none of the suggested keys have been pressed, automatically illuminating all of the keys;

after an additional configured timeframe where none of the illuminated all of the keys have been pressed, unilluminating all of the keys.

* * * * *